US009647262B2

(12) United States Patent
Hong et al.

(10) Patent No.: US 9,647,262 B2
(45) Date of Patent: *May 9, 2017

(54) CORE-SHELL TYPE ANODE ACTIVE MATERIAL FOR LITHIUM SECONDARY BATTERY, METHOD FOR PREPARING THE SAME AND LITHIUM SECONDARY BATTERY COMPRISING THE SAME

(75) Inventors: Ji-Jun Hong, Seoul (KR); Sung-Tae Ko, Nonsan-si (KR); Yoon-Jeong Heo, Nonsan-si (KR)

(73) Assignee: Kokam Co., Ltd., Siheung, Geonggi-do (KR)

( * ) Notice: Subject to any disclaimer, the term of this patent is extended or adjusted under 35 U.S.C. 154(b) by 1611 days.

This patent is subject to a terminal disclaimer.

(21) Appl. No.: 12/740,906

(22) PCT Filed: Nov. 6, 2007

(86) PCT No.: PCT/KR2007/005573
§ 371 (c)(1),
(2), (4) Date: Feb. 15, 2012

(87) PCT Pub. No.: WO2009/061013
PCT Pub. Date: May 14, 2009

(65) Prior Publication Data
US 2012/0135303 A1    May 31, 2012

(30) Foreign Application Priority Data

Nov. 5, 2007 (KR) .................. 10-2007-0112289

(51) Int. Cl.
H01M 4/131 (2010.01)
H01M 4/133 (2010.01)
(Continued)

(52) U.S. Cl.
CPC .......... *H01M 4/131* (2013.01); *H01M 4/133* (2013.01); *H01M 4/485* (2013.01); *H01M 4/583* (2013.01); *H01M 10/052* (2013.01)

(58) Field of Classification Search
None
See application file for complete search history.

(56) References Cited

U.S. PATENT DOCUMENTS 6,896,706 B2    5/2005  Lee et al.
7,588,826 B2    9/2009  Zaghib et al.
(Continued)

FOREIGN PATENT DOCUMENTS

JP    2001-243950 A      9/2001
JP    2001243950 A  *  9/2001  .............. H01M 4/58
(Continued)

OTHER PUBLICATIONS

JP-2001-243950A Machine Translation.*
(Continued)

*Primary Examiner* — Miriam Stagg
*Assistant Examiner* — Carmen Lyles-Irving
(74) *Attorney, Agent, or Firm* — Mintz Levin Cohn Ferris Glovsky and Popeo, P.C.; Kongsik Kim; Linda B. Azrin (57) ABSTRACT

The present invention relates to a core-shell type anode active material for a lithium secondary battery, a method of preparing the same, and a lithium secondary battery comprising the same. The anode active material for a lithium secondary battery according to the present invention comprises a carbon based material core portion; and a shell portion formed outside of the carbon based material core portion by coating the carbon based material core portion with a spinel-type lithium titanium oxide. The anode active material for a lithium secondary battery according to the present invention has the metal oxide shell portion, and thus (Continued)

(a)

(b)

has the improved conductivity, a high output density, and consequently excellent electrical characteristics.

7 Claims, 5 Drawing Sheets

(51) Int. Cl.
    *H01M 4/485*      (2010.01)
    *H01M 4/583*      (2010.01)
    *H01M 10/052*     (2010.01)

(56) References Cited

U.S. PATENT DOCUMENTS

| | | |
|---|---|---|
| 2005/0033622 A1 | 2/2005 | Kuo et al. |
| 2006/0222949 A1 | 10/2006 | Minamida et al. |
| 2007/0178382 A1 | 8/2007 | Kim et al. |

FOREIGN PATENT DOCUMENTS

| | | |
|---|---|---|
| JP | 2002-158139 A | 5/2002 |
| JP | 2006-066298 A | 3/2006 |
| KR | 10-2006-0028327 | 3/2006 |

OTHER PUBLICATIONS

Li et al., High Surface Area Graphitized Carbon with Uniform Mesopores Synthesized by a Colloidal Imprinting Method, Chem. Commun., May 22, 2002, pp. 1346-1347.*

Donaldson et al., Ultrafine Particles, Occup Environ Med 2001; 58:211-216 (2001).*

* cited by examiner

CORE-SHELL TYPE ANODE ACTIVE MATERIAL FOR LITHIUM SECONDARY BATTERY, METHOD FOR PREPARING THE SAME AND LITHIUM SECONDARY BATTERY COMPRISING THE SAME

CROSS-REFERENCES TO RELATED APPLICATIONS

This application is a U.S. national phase application, pursuant to 35 U.S.C. §371 of PCT/KR2007/005573, filed Nov. 6, 2007, designating the United States, which claims priority Korean Application No. 10-2007-0112289, filed Nov. 5, 2007. The entire contents of the aforementioned patent applications are incorporated herein by this reference.

TECHNICAL FIELD

The present invention relates to a core-shell anode active material for a lithium secondary battery, a method for preparing the same, and a lithium secondary battery comprising the same. In particular, the present invention relates to an anode active material, which can improve electrical characteristics and safety of a lithium ion secondary battery or lithium ion polymer battery, and a method for preparing the same.

BACKGROUND ART

With rapid development of electronics, communications and computer industries, portable electronic communication equipments such as camcorders, mobile phones or notebook computers develop remarkably. Accordingly, the demand for a lithium secondary battery as a power source for driving the portable electronic communication equipments is increasing day by day. In particular, in application of electric vehicles, uninterruptible power supplies, motor tools or artificial satellites, research and development of the lithium secondary battery as an environmentally friendly power source is lively made inside and outside of the country including Japan, Europe and U.S.A.

Currently, an anode active material for a lithium secondary battery includes a crystalline carbon such as a natural graphite or an artificial graphite, and an amorphous carbon such as a non-graphitizable carbon or a graphitizable carbon.

The natural graphite has advantages of low price, a flat discharge curve at a negative potential and excellent initial discharge capacity. However, charge/discharge efficiency and charge/discharge capacity reduce remarkably while charge and discharge cycles are repeated.

A mesophase graphite has a spherical particle shape and allows a high density filling, and thus is capable of improving an energy density per volume of a battery and exhibits excellence in forming an electrode plate. However, the mesophase graphite has a disadvantage of a low reversible capacity.

The non-graphitizable carbon has advantages of excellent safety and a large capacity. However, the non-graphitizable carbon has smaller size than a graphitizable carbon, and has a micropore, consequently low density, and after a pulverizing process, has irregular particle shape and particle size, and therefore, the non-graphitizable carbon is difficult to be applied to a battery widely.

And, to meet the demand for safety and a large capacity, a recent attention is given to a lithium titanium oxide. The lithium titanium oxide is an anode active material having a spinel-type stable structure, and thus is evaluated as one of materials capable of improving safety. In the case that the lithium titanium oxide is used as an anode active material, the lithium titanium oxide shows flatness of a potential curve, excellent charge and discharge cycle, improved high rate characteristics and power characteristics, and excellent durability. However, in the case that the lithium titanium oxide is used singularly, battery characteristics are reduced due to a low average voltage.

Therefore, various methods are suggested to solve the problems of the conventional anode active material. So far, however, there is no report of such an anode active material evaluated as it has excellent electrical characteristics and safety of a lithium secondary battery.

For example, Korean Patent Registration No. 10-066822 discloses a method for coating the surface of a conventional carbon with a metal or metalloid for a large capacity and a high efficiency of a battery.

Korean Patent Registration No. 10-0433822 discloses a method for coating the surface of a carbon active material with a metal or metal oxide to improve conductivity, high rate charge and discharge characteristics and cycle life.

Korean Laid-open Patent Publication No. 10-2007-0078536 discloses a method for coating a natural graphite with a low crystallinity carbon material.

Korean Laid-open Patent Publication No. 10-2006-0106761 discloses a method for adding graphite or carbon black to a lithium titanium oxide so as to prevent overcharge.

However, the methods suggested in the above-mentioned prior arts are evaluated as not sufficiently exhibiting effects of maintaining electrical characteristics well and improving safety of a lithium secondary battery.

Therefore, it requires to suggest an anode active material capable of maintaining excellent battery characteristics and exhibiting an excellent safety and a method for preparing the cathode active material with excellent reproducibility and productivity.

DISCLOSURE OF INVENTION

Technical Problem

An object of the present invention is to provide an anode active material for a lithium secondary battery, which can improve safety without deteriorating basic battery characteristics of the lithium secondary battery, and a method for preparing the anode active material with excellent reproducibility and productivity.

Technical Solution

In order to achieve the above-mentioned object, an anode active material for a lithium secondary battery according to the present invention comprises a carbon based material core portion, and a shell portion formed outside of the carbon based material core portion by coating the carbon based material core portion with a spinel-type lithium titanium oxide. The anode active material for a lithium secondary battery according the present invention comprises the metal oxide shell portion to improve conductivity and high output density, thereby resulting in excellent electrical characteristics. And, a lithium secondary battery using the above-mentioned anode active material for a lithium secondary battery according to the present invention can ensure safety sufficiently.

And, a method for preparing an anode active material for a lithium secondary battery according to the present invention comprises (S1) preparing a carbon based material for forming a core portion; and (S2) coating the core portion with a spinel-type lithium titanium oxide to form a shell portion outside of the core portion.

The method for preparing an anode active material may further comprise heating the resultant product of the step (S2).

The above-mentioned anode active material for a lithium secondary battery may be used to manufacture an anode of a lithium secondary battery and a lithium secondary battery comprising the anode.

MODE FOR THE INVENTION

Hereinafter, a cathode active material for lithium secondary batteries of the present invention will be described in detail according to its preparation method. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

First, a carbon based material for forming a core portion is prepared (S1).

The carbon based material usable in the present invention is not limited to a specific material if it is a carbon based material used as an anode active material for a lithium secondary battery in the prior art. For example, the carbon based material includes a low crystallinity carbon and a high crystallinity carbon. Typically, the low crystallinity carbon includes a soft carbon and a hard carbon, and the high crystallinity carbon includes a high temperature plasticity carbon such as a natural graphite, Kish graphite, a pyrolytic carbon, a mesophase pitch based carbon fiber, meso-carbon microbeads, mesophase pitches, and petroleum or coal tar pitch derived cokes.

Next, the core portion is mated with a spinel-type lithium titanium oxide to form a shell portion outside the core portion (S2).

The anode active material of the present invention is prepared by coating the carbon based material core portion with the spinel-type lithium titanium oxide, thereby improving the battery performance. For example, in the case of a natural graphite, charge/discharge efficiency and charge/discharge capacity reduce remarkably while charge and discharge cycles are repeated, which is resulted from a decomposition reaction of an electrolyte liquid occurring at an edge portion of the natural graphite of high crystallinity. However, in the case that the natural graphite is mated with the shell portion according to the present invention, the reaction between the edge portion and the electrolyte liquid is prevented to solve the above-mentioned problems. And, in the case of a low crystallinity carbon, suppressing effects of reactivity with an electrolyte and moisture sensitivity are increased through surface mating according to the present invention, thereby improving the battery performance.

The shell portion of the present invention is described in detail as follows.

In the anode active material of the present invention, charging is performed on the spinel-type lithium titanium oxide ($Li_4Ti_5O_{12}$) for the shell portion in the proximity of 1.0 to 1.2V based on a lithium metal earlier than the carbon based material for the core portion, so that a film having good ion conductivity in the above-mentioned range is formed on the surface of an anode. And, an activated lithium titanium oxide layer reduces resistance of the surface of the anode. As a result, the anode active material of the present invention can have excellent electrical characteristics.

And, the film suppresses a reaction between the carbon based material corresponding to the core portion and a non-aqueous electrolyte liquid, and thus it prevents phenomena that the non-aqueous electrolyte liquid is decomposed or a stricture of the anode is destroyed. And, the lithium titanium oxide of the shell portion and the film surround the carbon based material core portion, so that a contact between the core portion and the electrolyte liquid is restricted. Accordingly, a phenomenon that lithium is educed on the surface of the anode active material is suppressed to reduce an amount of heat involved in the reaction with the electrolyte liquid. Therefore, the anode active material of the present invention can provide excellent battery performance and safety.

A content of the spinel-type lithium titanium oxide for the shell portion may be selected properly according to purpose of use, kind or a manufacturing environment of a lithium secondary battery. For example, a weight ratio of the carbon based material core portion to the spinel-type lithium titanium oxide shell portion is adjusted such that the carbon based material:the spinel-type lithium titanium oxide=1: 0.0055~0.05. The above-mentioned range can have an intentional effect of the present invention because a redundant lithium titanium oxide does not leave behind and the entire surface of the carbon based material is sufficiently coated.

An average particle size of the spinel-type lithium titanium oxide for the shell portion may vary depending on purpose of use or manufacturing environment, for example 30 to 800 nm. The above-mentioned range is preferable because agglomeration of particles is minimized and a coating process is performed effectively.

A method for coating the carbon based material core portion with the spinel-type lithium titanium oxide may use a typical coating process used in the prior art without limitation, and select a coating process properly according to necessity. For example, the typical coating process includes a dry coating process and a wet coating process.

The wet coating process allows uniform dispersion of coating materials. For a specific example, the wet coating process is performed as follows: a dispersion liquid or suspension liquid, in which coating materials are dispersed, or a solution in which coating materials are dissolved is sprayed onto or impregnated into the anode active material and dried.

And, the dry coating process coats the surface of a core portion with coating materials for a shell portion in a mechanical manner. A shear force, a collision force or a compression force is applied according to necessity, thereby allowing from simple mixing to coating. In particular, in the present invention, sphericity and disintegration occur to the carbon based material corresponding to the core portion by the nano metal oxide corresponding to the shell portion, thereby improving powder characteristics.

After the shell portion is coated as mentioned above, heating may be further performed according to necessity. The heating increases an adhesive strength between the carbon based material and the lithium titanium oxide, and removes impurities.

The heating conditions may be selected properly according to a manufacturing environment such as kind of the carbon based material for the core portion, for example the heating may be performed at 400 to 450° C. for 1 to 4 hours, however the present invention is not limited in this regard. The above-mentioned heating temperature is preferable because the density of the shell portion is excellent, a defect in crystal structure of the core portion can be corrected sufficiently and the structure of the core portion can be maintained stably. In the above-mentioned heating time, an effect of the heating can be obtained sufficiently, and in the case that the heating time exceeds 4 hours, an additional effect by the increased heating time can not be expected.

Through the above-mentioned method, an anode active material of the present invention can be obtained, and an anode of a lithium secondary battery and a lithium secondary battery can be manufactured using the same. In the manufacture of the anode of a lithium secondary battery and the lithium secondary battery using the anode active material of the present invention, a typical method used in the prior art can be applied without limitation.

A method for manufacturing a lithium secondary battery is described as follows.

First, an electrode active material composition including an electrode active material, a binder, a conductive material and a solvent is coated on a current collector to form an electrode active material layer. At this time, the electrode active material layer is formed such that the electrode active material composition is directly coated on the current collector, or such that the electrode active material composition is coated on a separate support and dried to form a film, and the film is separated from the support and laminated onto the current collector. Here, the support is not limited to a specific one if it is capable of supporting the electrode active material layer, for example a Mylar film or a polyethyleneterephthalate (PET) film.

The cathode electrode active material, binder, conductive material and solvent may be all typical ones used to manufacture a lithium secondary battery in the prior art. For a specific example, an electrode active material for a cathode may be a lithium-containing metal oxide such as $LiCoO_2$, $LiNiO_2$ and $LiMn_2O_4$ or a lithium-containing metal oxide obtained by adding Co, Ni or Mn to the above-mentioned lithium-containing metal oxide, such as $LiNi_{1-x}Co_xO_2$, and may be sulfide, selenide or halide other than the above-mentioned oxides.

The binder may be polyvinylidenefluoride-hexafluoropropylene copolymer (PVDF-co-HFP), polyvinylidenefluoride, polyacrylonitrile, polymethylmethacrylate, or mixtures thereof. Typically, the conductive material may be carbon black or acetylene black, and the solvent may be acetone or N-methylpyrrolidone.

An electrode is formed as mentioned above, and a separator is interposed between a cathode electrode plate and an anode electrode plate, and thus an electrode assembly is manufactured. Subsequently, the manufactured electrode assembly is put into a case and an electrolyte liquid for a lithium secondary battery is added, so that a lithium secondary battery of the present invention is completed.

Hereinafter, the preferred embodiments of the present invention are described in detail with reference to the accompanying drawings. However, it should be understood that the detailed description and specific examples, while indicating preferred embodiments of the invention, are given by way of illustration only, since various changes and modifications within the spirit and scope of the invention will become apparent to those skilled in the art from this detailed description.

Example 1

Preparing of Core-Shell Type Anode Active Material

Meso-carbon microbeads (MCMB) (Osaka Gas Co., Ltd.) were prepared as a carbon based material for a core portion, and a spinel-type lithium titanium oxide having a particle size distribution of 30 to 500 nm was prepared as a material for a shell portion. 1,000 g of the prepared MCMB was mixed with 20 g of the lithium titanium oxide, and the mixture was treated in a dry coating system (Hosokawa Micron Corp., Japan, NOB-130) with a speed of rotation of 2500 rpm for 3 minutes. Subsequently, the resultant was heated at 450° C. under an oxygen atmosphere for 4 hours with a temperature increase rate of 2° C./min to prepare a core-shell type anode active material.

Manufacturing of Anode and Lithium Secondary Battery

The prepared anode active material, a conductive carbon for providing conductivity, and PVdF (polyvinylidenefluoride) as a binder were mixed with a mixing ratio of 85/8/7, and a proper amount of NMP (N-methylpyrrolidone) was added to obtain a slurry having a proper viscosity. The slurry was coated on a copper foil, dried and compressed to obtain an anode of a lithium secondary battery.

A lithium metal oxide composite, $LiNi_{(1-x-y)}Mn_xCo_yO_2$ was used as a cathode, a separator was interposed between the above-mentioned anode and cathode, and an aluminum outer member was applied to manufacture a lithium secondary battery. The battery had a size of 4.5 mm thickness×64 mm width×95 mm length, and a design capacity of 2000 mAh.

Example 2

An anode active material, an electrode and a lithium secondary battery were manufactured by the same method as that of the Example 1, except that 10 g of a lithium titanium oxide was used and heating was not performed.

Example 3

An anode active material, an electrode and a lithium secondary battery were manufactured by the same method as that of the Example 1, except that heating was not performed.

Example 4

An anode active material, an electrode and a lithium secondary battery were manufactured by the same method as that of the Example 1, except that 30 g of a lithium titanium oxide was used and heating was not performed.

Example 5

An anode active material, an electrode and a lithium secondary battery were manufactured by the same method as that of the Example 1, except that 50 g of a lithium titanium oxide was used and heating was not performed.

Comparative Example 1

An electrode and a lithium secondary battery were manufactured by the same method as that of the Example 1, except that only MCMB was used instead of the core-shell type anode active material.

Comparative Example 2

An electrode and a lithium secondary battery were manufactured by the same method as that of the Example 1, except that a mixture of MCMB and a lithium titanium oxide mixed with a weight ratio of 90:10 was used as an anode active material instead of the core-shell type anode active material.

Characteristics Evaluation
1. Powder Characteristics

Figure 1:
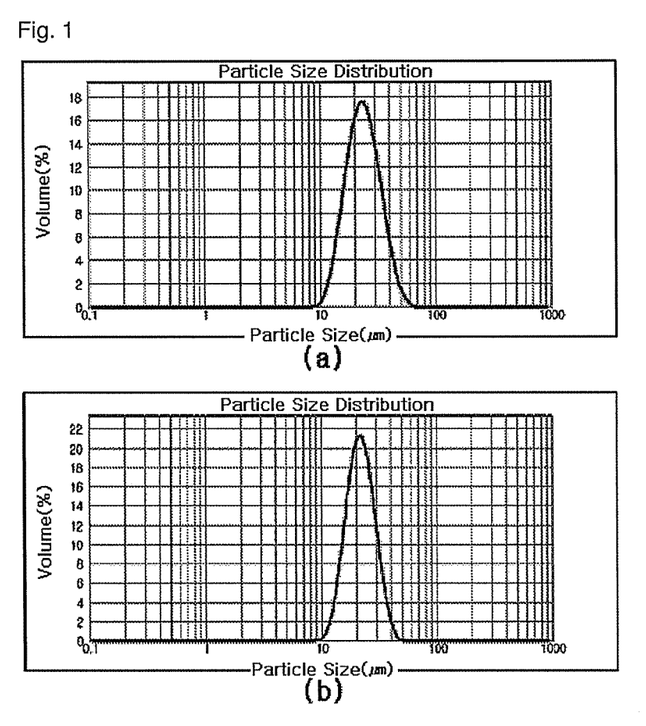
FIG. 1 is a graph illustrating particle size distribution before coating (a) and after coating (b) of an anode active material prepared in Example 1.

The average particle size, $D_{10}$, $D_{50}$ and $D_{90}$ before and after coating of anode active materials prepared in the examples was measured by a laser diffraction technology while particles were dispersed using ultrasonic waves. A particle size analysis system (Malvern Instruments, Mastersizer 2000E) was used to measure the average particle size. FIG. 1 shows measurement results of an anode active material prepared in the Example 1, and as a specific data, an average particle size before coating is as follows $D_{10}=15.380$ μm, $D_{50}=23.519$ μm, and $D_{90}=36.396$ μm, and an average particle size after coating is as follows: $D_{10}=15.291$ μm, $D_{50}=21.795$ μm, and $D_{90}=31.054$ μm.

And, 500 times of strokes were performed using 100 ml mass cylinder to measure a tap density, and changes in volume between before coating and after coating were measured.

As a result of the measurement, the average particle size and tap density hardly changed according to coating content, and after coating, the average particle size was decreased by 8 to 9%, and the tap density was increased by 1 to 2%.

2. Coating Characteristics

Figure 2:
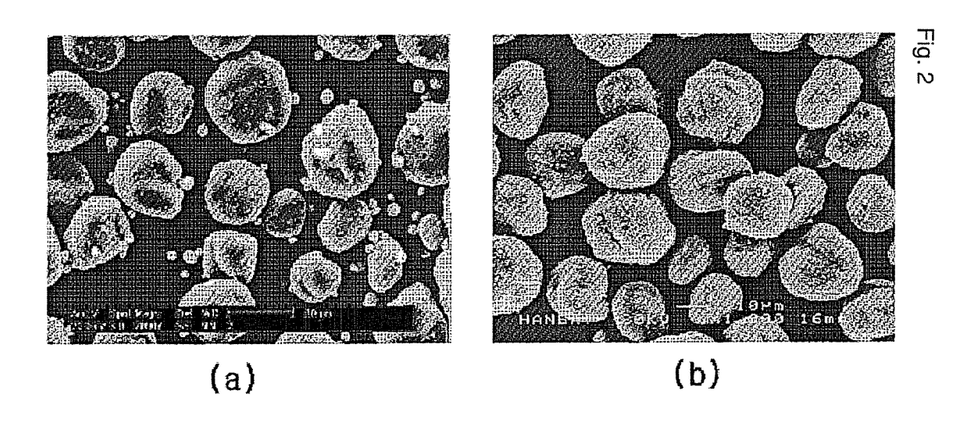
FIG. 2 shows SEM (Scanning Electron Microscope) photographs of the anode active material (a) prepared in Example 1 and an anode active material (b) prepared in Comparative example 1.
Figure 3:
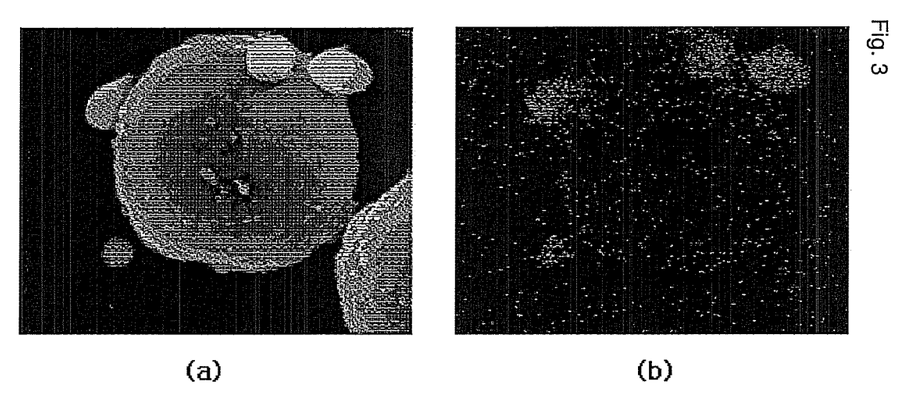
FIG. 3 shows SEM photographs of cross-sectional mapping of particles of the core-shell anode active material prepared in Example 1.

To check the surface characteristics of the Example 1 and Comparative example 1, results measured using SEM (Scanning Electron Microscope) are shown in FIG. 2. And, mapping of the core-shell type cathode active material obtained in the Example 1 is shown in FIG. 3. As shown in FIGS. 2 and 3, the carbon based material of the present invention is coated uniformly with a lithium titanium oxide.

3. Electrochemical Characteristics

The batteries manufactured in the examples and the comparative examples were initially charged using a charge/discharge cycle system on conditions of CC-CV (constant current-constant voltage) of a charge voltage of 4.2 V and a current density of 400 mAh at 25° C., and after a resting stage of 10 minutes, were discharged with a discharge capacity of 1000 mAh until the voltage is 2.7 V, and electrical characteristics and safety were evaluated.

Figure 4:
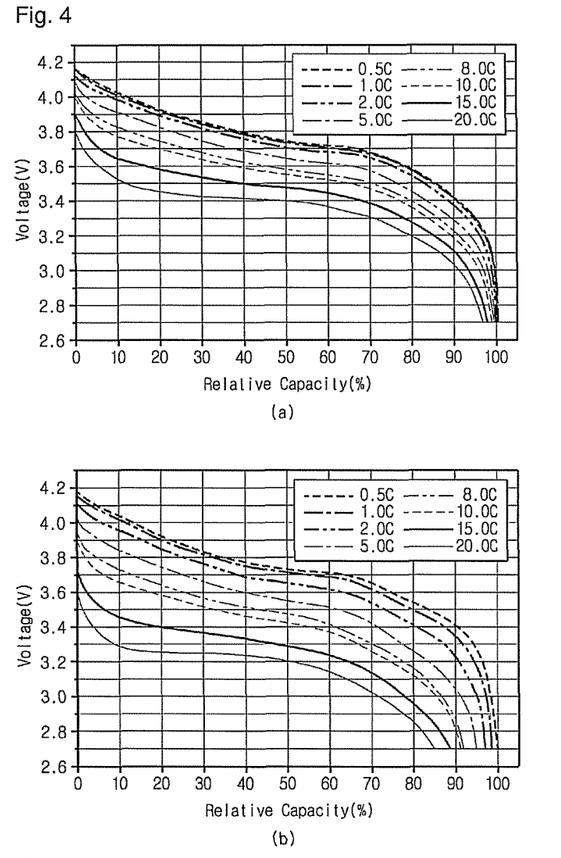
FIG. 4 is a graph illustrating discharge characteristics according to current density of a lithium secondary battery (a) using the anode active material prepared in Example 1 and a lithium secondary battery (b) using the anode active material prepared in Comparative example 1.
Figure 5:
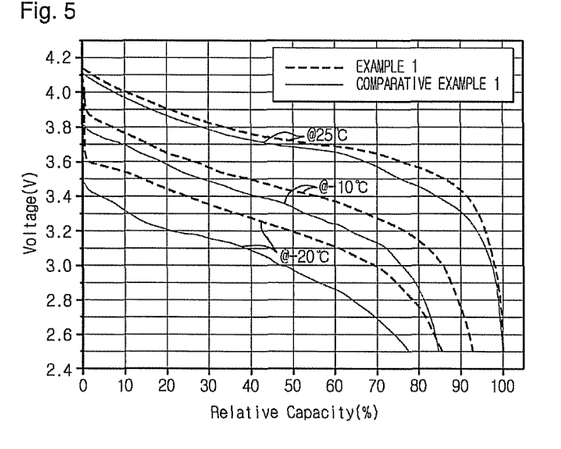
FIG. 5 is a graph illustrating discharge characteristics according to temperature of the lithium secondary battery (a) using the anode active material prepared in Example 1 and the lithium secondary battery (b) using the anode active material prepared in Comparative example 1.

And, to evaluate an extent of improvement of conductivity, discharge characteristics and low temperature discharge characteristics according to current density were measured. The discharge characteristics according to current density were measured by charging on conditions of CC-CV of a current density of 2000 mAh and a charge voltage of 4.2 V at 25° C., and after a resting stage of 10 minutes, discharging with a discharge current of 0.5 C to 20.0 C until the voltage is 2.7 V. And, the discharge characteristics according to current density shows as a ratio of a discharge capacity at a current density of 20 C to a discharge capacity at a current density of 0.5 C (1000 mA) as a standard capacity with using high rate characteristics before and after coating are shown in the following Table 2. FIG. 4 is a graph illustrating discharge characteristics (a) according to current density of the Example 1 and discharge characteristics (b) according to current density of the Comparative example 1. Further, a low temperature discharge characteristics test was made at −10° C. and −20° C. with a current density of 1 C in the voltage range of 2.5 V to 4.2 V with a discharge capacity of 1 C at 25° C. as a standard capacity. The following Table 2 shows the low temperature discharge characteristics, and FIG. 5 shows low temperature discharge characteristics of the Example 1 and the Comparative example 1.

As shown in the following Table 1, as the coating content of lithium titanium oxide increases, initial charge/discharge efficiency and specific rapacity are reduced, however, it is found through the Table 2 and FIGS. 4 and 5 that conductivity was improved due to high rate discharge characteristics and low temperature discharge characteristics.

Figure 6:
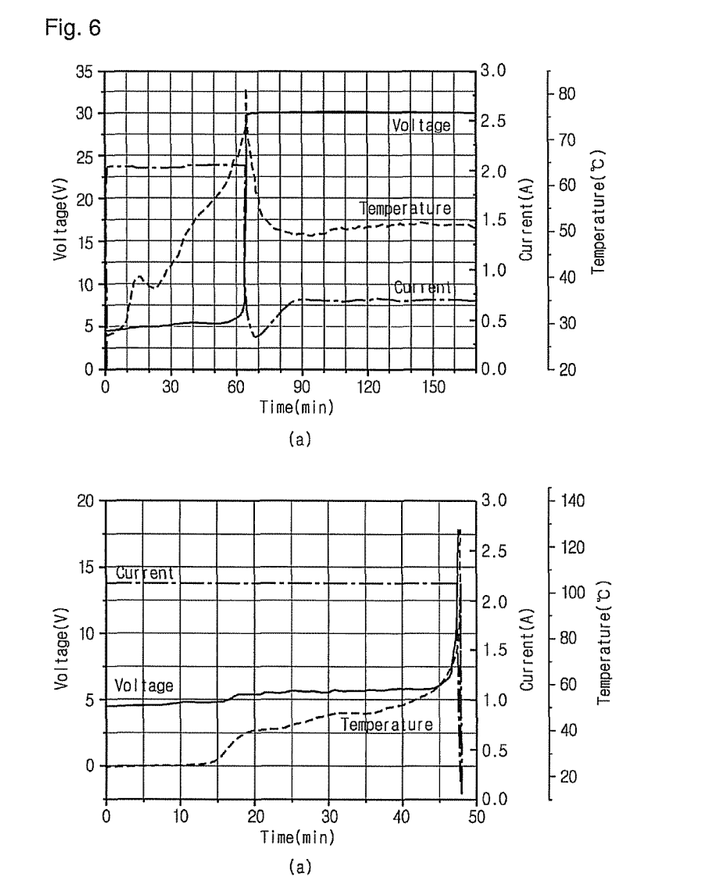
FIG. 6 is a graph illustrating changes in battery behavior and surface temperature after an overcharge test at 30V of the lithium secondary battery (a) using the anode active material prepared in Example 1 and the lithium secondary battery (b) using the anode active material prepared in Comparative example 1.
Figure 7:
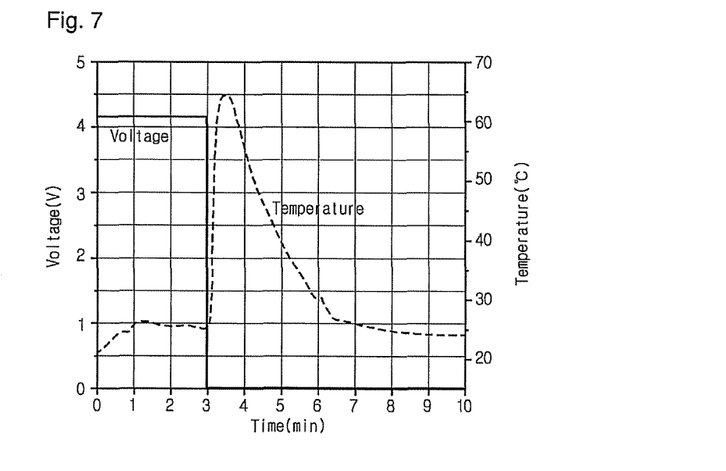
FIG. 7 is a graph illustrating changes in battery behavior and surface temperature after a nail penetration test of the lithium secondary battery using the anode active material prepared in Example 1.

And, an overcharge test and a nail penetration test were made on the anode active materials prepared in the Example 1 and the Comparative example 1. The overcharge test was made with a current density of 2000 mA at 18 V, 24 V and 30 V to measure changes in shape and surface temperature of a battery after overcharge, and measurement results are shown in the following Table 3. FIG. 6 shows changes in battery behavior and surface temperature after an overcharge test at 30V (Example 1: a, Comparative example 1: b). After evaluation of the nail penetration test, the surface temperature of a battery is shown in Table 3, and FIG. 7 shows changes in battery behavior and surface temperature of the Example 1.

TABLE 1

| Classification | Coating content (weight %) | 1st charge (mAh) | 1st discharge (mAh) | 1st efficiency (%) | Specific capacity (mAh/g) |
|---|---|---|---|---|---|
| Example 1 | 2.0, heating | 2440 | 2100 | 86.5 | 145.0 |
| Example 2 | 1.0 | 2400 | 2100 | 87.7 | 147.0 |
| Example 3 | 2.0 | 2450 | 2120 | 86.5 | 145.0 |
| Example 4 | 2.9 | 2410 | 2010 | 83.6 | 140.0 |
| Example 5 | 4.8 | 2450 | 1970 | 80.3 | 134.6 |

TABLE 1-continued

| Classification | Coating content (weight %) | 1st charge (mAh) | 1st discharge (mAh) | 1st efficiency (%) | Specific capacity (mAh/g) |
|---|---|---|---|---|---|
| Comparative example 1 | 0.0 | 2400 | 2130 | 88.5 | 152.0 |
| Comparative example 2 | 10, mixing | 2370 | 1880 | 79.5 | 133.3 |

TABLE 2

| Classification | Coating content (weight %) | 20 C. discharge character-istics (@ 0.5 C., %) | Low temperature discharge characteristics @ −10° C. (@ 25° C., %) | Low temperature discharge characteristics @ −20° C. (@ 25° C., %) |
|---|---|---|---|---|
| Example 1 | 2.0, heating | 96.6 | 93.4 | 86.0 |
| Example 2 | 1.0 | 88.6 | 87.9 | 80.2 |
| Example 3 | 2.0 | 93.7 | 93.0 | 82.8 |
| Example 4 | 2.9 | 91.5 | 90.9 | 79.6 |
| Example 5 | 4.8 | 85.3 | 88.3 | 70.3 |
| Comparative example 1 | 0.0 | 84.9 | 85.6 | 77.8 |
| Comparative example 1 | 10, mixing | 80.4 | 79.6 | 68.3 |

TABLE 3

| Classification | Coating content (weight %) | Battery behavior, maximum battery surface temperature (° C.) 18 V | 24 V | 30 V | Nail penetration test |
|---|---|---|---|---|---|
| Example 1 | 2.0, heating | A, 60 | A, 72 | A, 83 | A, 65 |
| Example 2 | 1.0 | A, 85 | C, 180 | x | B, 103 |
| Example 3 | 2.0 | A, 65 | A, 74 | A, 86 | A, 68 |
| Example 4 | 2.9 | A, 56 | A, 70 | A, 80 | A, 63 |
| Example 5 | 4.8 | A, 52 | A, 64 | A, 77 | A, 63 |
| Comparative example 1 | 0.0 | D, 270 | x | x | D, 310 |
| Comparative example 2 | 10, mixing | C, 180 | x | x | C, 200 |

A: no change, B: smoke generation, C: fire, D: explosion

The above Tables show that the Examples 1 to 5 have a little lower initial charge/discharge efficiency and specific capacity than the Comparative example 1, and this is because the surface of MCMB is coated with a nano-sized lithium titanium oxide, consequently an irreversible capacity occurs at the other potential area, and as a result, the Examples 1 to 5 exhibit a little low specific capacity. However, this is not an important factor to battery characteristics. On the contrary, the Comparative example 1 shows higher initial charge/discharge efficiency and specific capacity, but shows very weak characteristics in the evaluation about conductivity and safety.

However, the examples prevent a side reaction with an electrolyte liquid and reduces resistance of the surface of an active material by an activated shell coating layer, and thus show considerable improvement of high rate characteristics and low temperature discharge characteristics. In particular, through heating after coating, the Example 1 increases an adhesive strength between a carbon based material and a lithium titanium oxide and has an impurity removing effect, and thus is more effective in improvement of performance.

Meanwhile, in the case of an anode active material of the Comparative example 2, obtained by simply mixing a carbon based material and a lithium titanium oxide, because the carbon based material and the lithium titanium oxide are operated at different voltage ranges, performance of a battery is reduced and safety does not take effect.

INDUSTRIAL APPLICABILITY

An anode active material for a lithium secondary battery according to the present invention comprises a carbon based material core portion and a spinel-type lithium titanium oxide shell portion, and thus, a lithium secondary battery using the same exhibits excellent electrical characteristics and safety. And, a method for preparing the anode active material for a lithium secondary battery according to the present invention has excellent reproducibility and productivity in preparing the core-shell type anode active material of the present invention. Therefore, the present invention is useful in an industrial application of a lithium secondary battery.

The invention claimed is:

1. An anode active material for a lithium secondary battery, comprising:
    a carbon based material core portion; and
    a shell portion formed outside of the carbon based material core portion by dry coating the carbon based material core portion with a spinel-type lithium titanium oxide,
    wherein the spinel-type lithium titanium oxide has an average particle size of 30 to 800 nm, and
    wherein the weight ratio of the carbon based material core portion to the spinel-type lithium titanium oxide shell portion is adjusted such that the carbon-based material: the spinel-type lithium titanium oxide=1:0.0055–0.0200.

2. The anode active material for a lithium secondary battery according to claim 1,
    wherein the carbon based material for forming the core portion is any one selected from the group consisting of a soft carbon, a hard carbon, a natural graphite, Kish graphite, a pyrolytic carbon, a mesophase pitch based carbon fiber, meso-carbon microbeads, mesophase pitches, and petroleum or coal tar pitch derived cokes, or mixtures thereof.

3. A method for preparing an anode active material for a lithium secondary battery according to claim 1, comprising:
    (S1) preparing a carbon based material for forming a core portion; and
    (S2) dry coating the core portion with a spinel-type lithium titanium oxide to form a shell portion outside of the core portion.

4. The method for preparing an anode active material for a lithium secondary battery according to claim 3, further comprising:
    heating the resultant product of the step (S2).

5. The method for preparing an anode active material for a lithium secondary battery according to claim 4,
    wherein the heating is performed at 450 to 500° C. for 1 to 4 hours.

6. An anode of a lithium secondary battery, comprising:
    an anode collector; and
    an anode active material layer including an anode active material, a binder and a conductive material, and formed on at least one surface of a anode collector, wherein the anode active material is defined in any one of claims 1 to 2.

7. A lithium secondary battery comprising:
    a cathode;
    an anode; and
    a separator interposed between the cathode and the anode, wherein the anode is defined in claim 6.

* * * * *